United States Patent [19]
Winters

[11] 3,775,214
[45] Nov. 27, 1973

[54] METHOD OF FABRICATING HOLLOW FRAME STRUCTURES FOR BOATS AND THE LIKE

[75] Inventor: Henry Winters, North Miami, Fla.

[73] Assignee: Salvatore G. Militana, Miami Shores, Fla. ; a part interest

[22] Filed: July 19, 1971

[21] Appl. No.: 163,656

[52] U.S. Cl.......................... 156/245, 9/6, 156/285, 156/286, 156/287, 156/288, 264/250, 264/102
[51] Int. Cl............................ B29c 5/00, B29g 5/00
[58] Field of Search............................ 9/6, 6.5, 242; 156/245, 285, 286, 287, 288; 264/250, 251, 107, 102, 260, 261

[56] References Cited
UNITED STATES PATENTS

| | | | |
|---|---|---|---|
| 3,344,007 | 9/1967 | Skoggard............................ | 156/285 |
| 2,956,292 | 10/1960 | Newsome................................... | 9/6 |
| 2,950,701 | 8/1960 | Stefani....................... | 9/6 |
| 3,124,626 | 3/1964 | Graham et al.............................. | 9/6 |

FOREIGN PATENTS OR APPLICATIONS

| | | | |
|---|---|---|---|
| 544,137 | 10/1941 | Great Britain...................... | 156/245 |

Primary Examiner—Alfred L. Leavitt
Assistant Examiner—Frank Frisenda
Attorney—Salvatore G. Militana

[57] ABSTRACT

The method of fabricating hollow frame structures for boats and the like of fiberglass reinforced plastic consists of the steps of the simultaneous production of an inner and outer matching shells on a male and female mold respectively by the conventional laying up of glass fibers and resins. Upon partial curing of the outer and inner shells, an adhesive is applied to the exposed contacting surfaces. The inner shell is removed from the male mold and superimposed on the matching outer shell. The configuration of the inner shell provides a plurality of longitudinal and/or transverse stiffeners forming a plurality of communicating chambers between the two shells and an opening is then made in the inner shell for connecting a vacuum creating apparatus thereto. The edges of the superimposed shells having been trimmed prior to removal from their mold as rendered airtight upon placing a tape along the juncture thereof. Upon applying a partial vacuum to the communicating chambers, atmospheric pressure will exert an even pressure against all faying or contacting surfaces to effect a proper adhesion of the inner and outer shell sections to form a hollow frame structure of fiberglass reinforced plastic.

4 Claims, 13 Drawing Figures

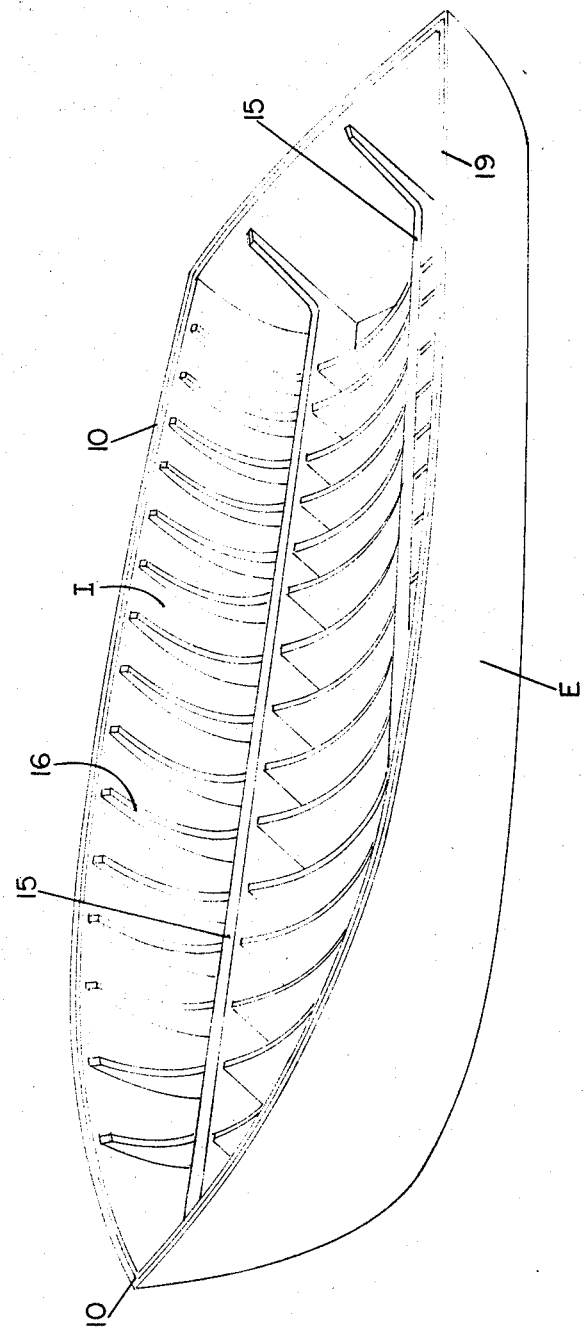

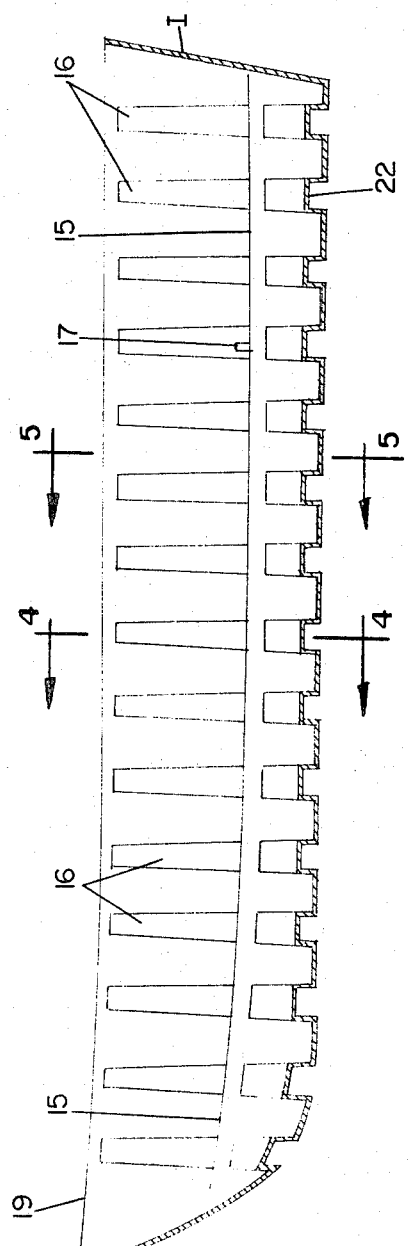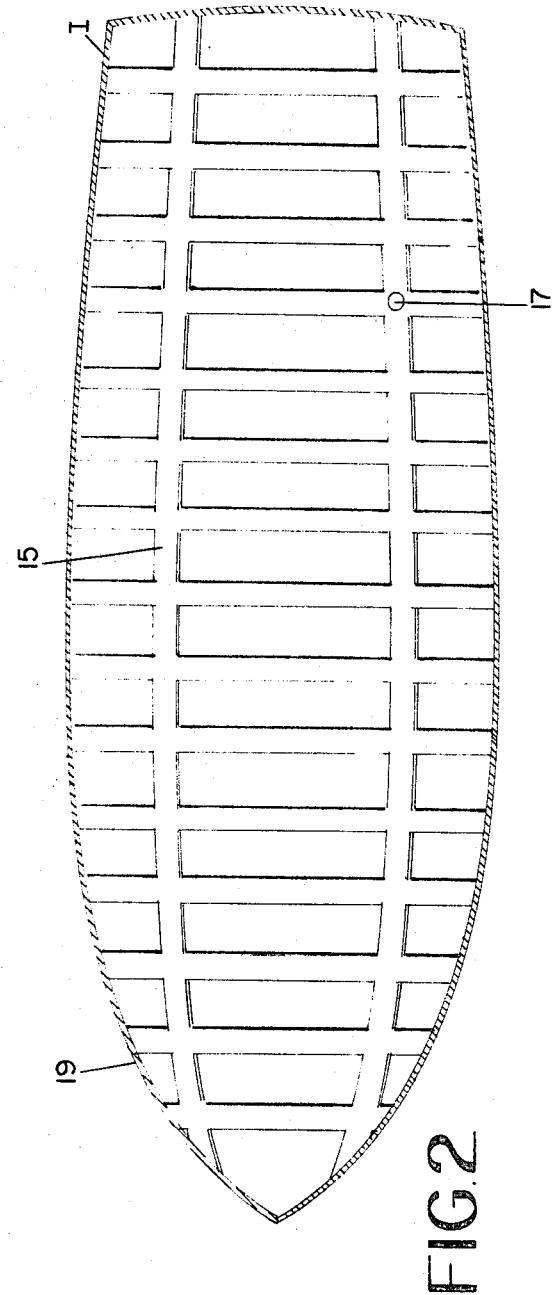

3,775,214

METHOD OF FABRICATING HOLLOW FRAME STRUCTURES FOR BOATS AND THE LIKE

BACKGROUND OF THE INVENTION

This invention relates to the fabrication of hollow frame structures such as boats and the like wherein the hull is formed in two matching shells simultaneously which are superimposed one on the other with an adhesive having been sprayed on the contacting surfaces and a vacuum applied to the chambers formed by the non-contacting surfaces. At the present time the conventional manner of fabricating a hull is by laying up fiberglass reinforced plastic on a female mold and permitting the plastic to cure after which wood framework or previously prepared individual hollow fiberglass frames are fastened and bonded into place in the hull. Then when the proper curing of the plastic has taken effect, the hull is removed from the female mold and the female mold is prepared for fabricating a further hull. It is readily noted that the time during which the female mold is in use to produce one hull is long taking as much as 1 week, and therefore costly as well as having to require the use of highly skilled labor in the placement of the framework in the hull. Also, the workers are exposed to toxic fumes during this time. It has been found that by the conventional method of fabricating hulls, no two boats formed on the same mold are exactly alike or of consistent quality. The disadvantage of the present manner of fabricating boats can be listed as requiring highly skilled labor, too long a mold time for each hull and not lending to a proper quality control as well as exposing the workers to toxic fumes. In all, the conventional manner of fabricating fiberglass structures such as boat hulls do not lend themselves to the highly desirable mass production methods.

PURPOSE OF THE INVENTION

It is the main purpose of the present invention to provide a method of fabricating ahollow structure such as boat hulls and the like which method lends itself readily to the mass production of the structures thereby reducing the costs of production as well as reducing to a minimum the time in which a mold is in use to produce one such structure.

Another object of the present invention is to provide a method of fabricating a fiberglass structure such as a boat and the like, which requires the use of semi or unskilled labor and which does not require the workers to expose themselves to toxic fumes or otherwise dangerous conditions.

A further object of the present invention is to provide a method of fabricating a reinforced plastic boat which results in a hollow frame structure that is as strong as the solid or hollow frame structures produced by the conventional method without the use of fasteners and the like, and whose exposed surfaces become finished in the normal course of fabrication.

A still further object of the present invention is to fabricate a boat hull and the like by a method which not only lends itself to mass production methods but also permits quality control of a constant and high degree.

In the drawings:

FIG. 1 is a perspective view of a hull of a boat manufactured in accordance with my method of fabrication.

FIG. 2 is a top plan view thereof.

Figure 4:
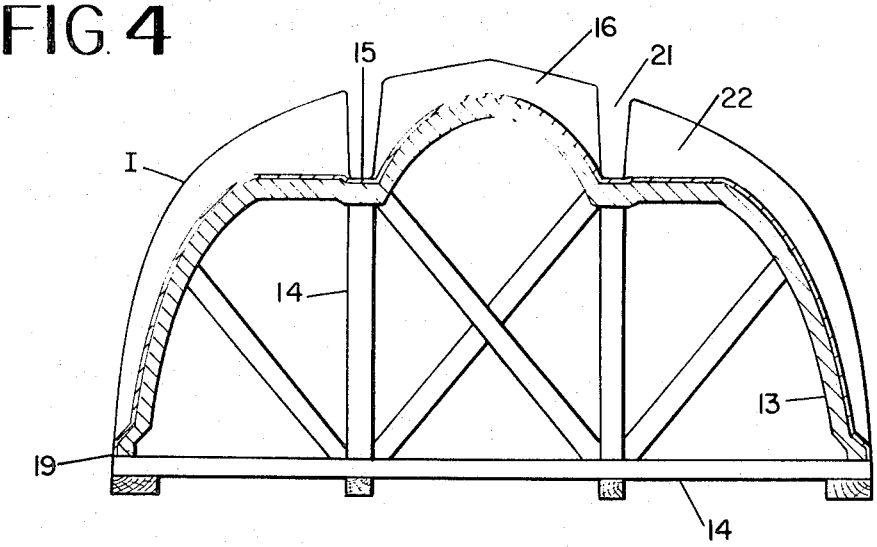
Figure 5:
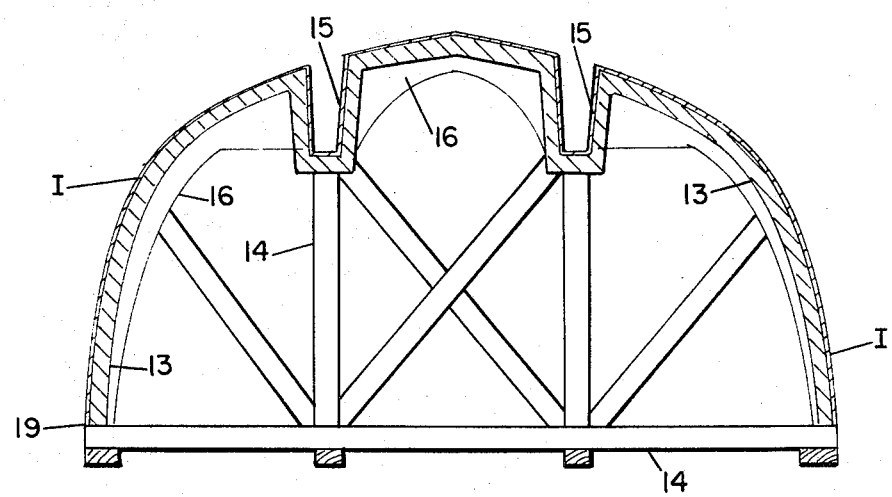

FIGS. 4 and 5 are cross sectional views taken along the lines 4—4 and 5—5 respectively of FIG. 6 shown in position in a conventional mold for forming the inner hull shell.

FIG. 6 is a longitudinal cross sectional view of the inner hull shell.

Figure 3:
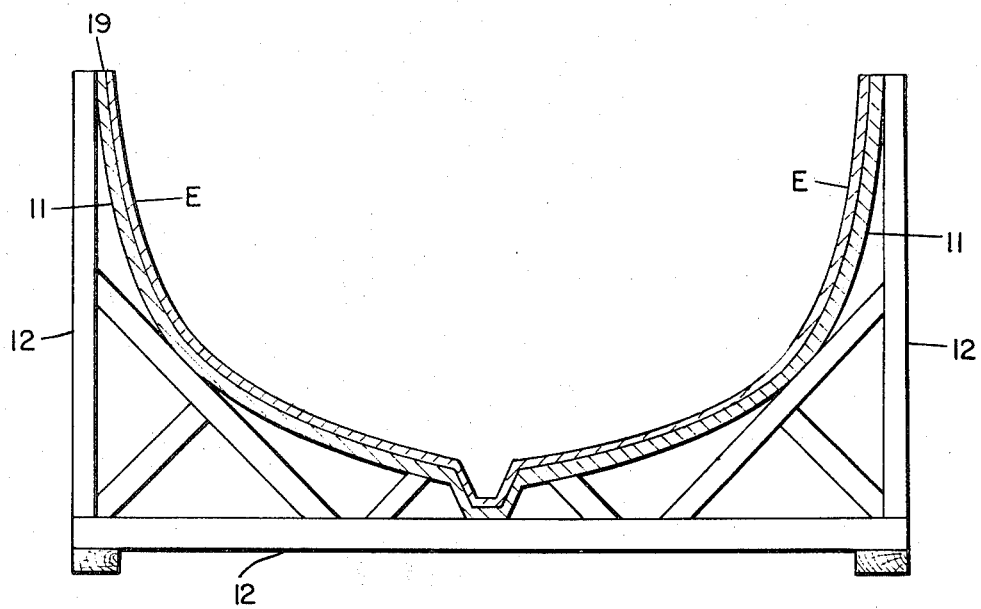
FIG. 3 is a transverse cross sectional view of a conventional mold in which the outer hull shell is shown being molded.
Figure 7:
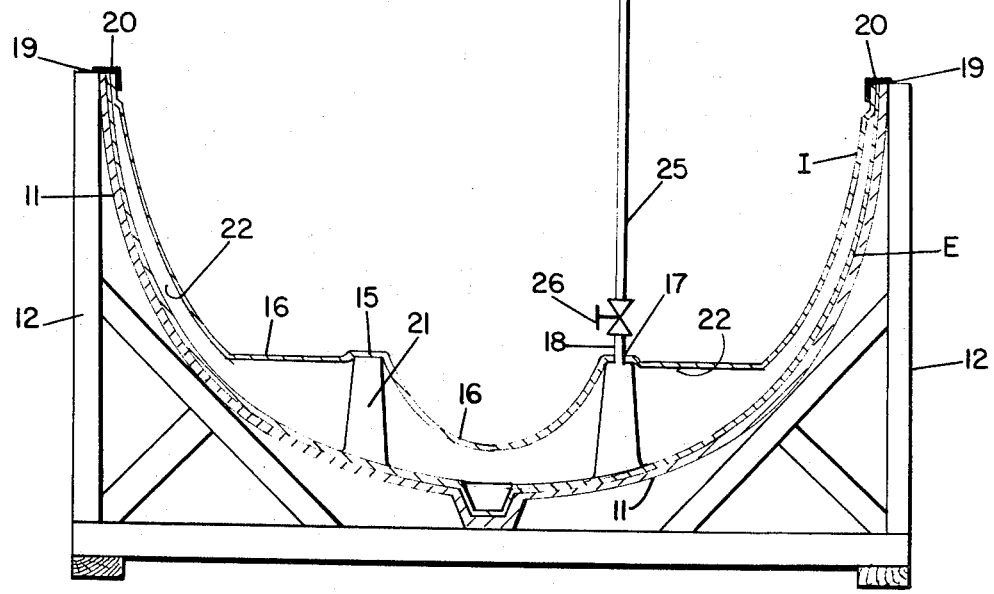
Figure 8:
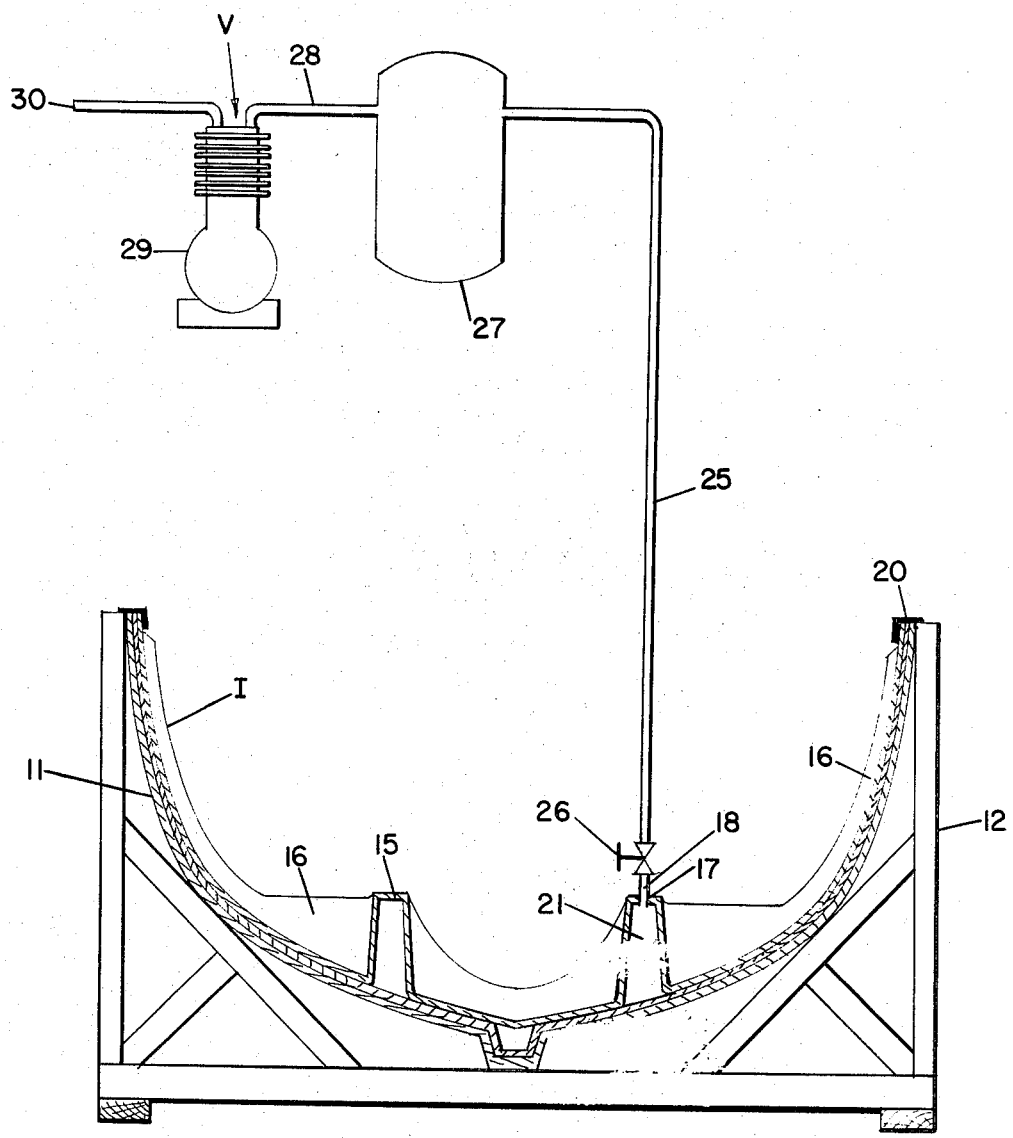

FIGS. 7 and 8 are similar to FIG. 3 with the inner hull shell in position, the sections being taken along the same lines as shown by FIGS. 4 and 5, respectively.

Figure 9:
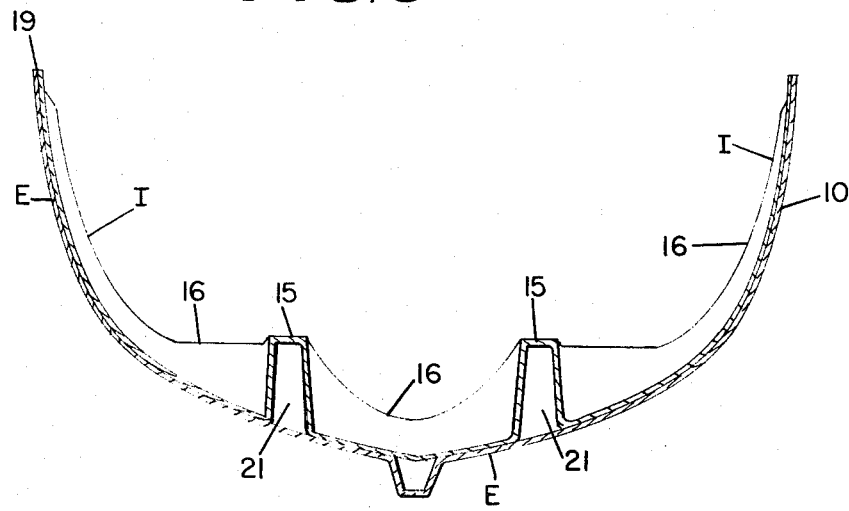

FIG. 9 is a cross sectional view of the completed hull as shown removed from the mold.

Figure 10:
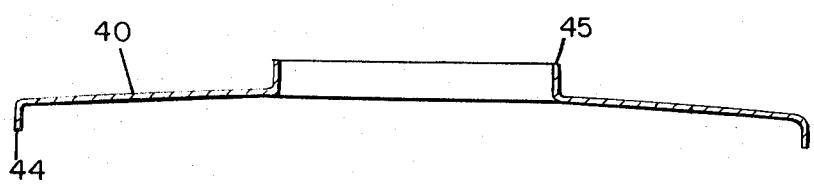
Figure 11:
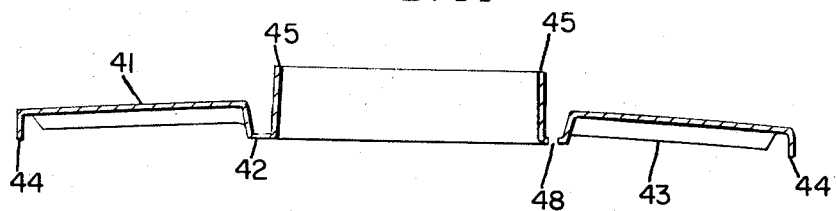

FIGS. 10 and 11 are cross sectional views of an outer and inner deck shells respectively.

Figure 12:
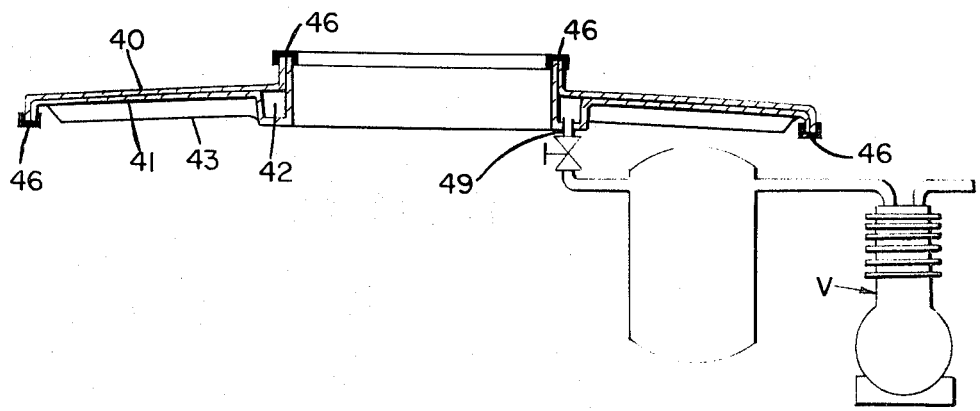

FIG. 12 is a cross sectional view of the completed deck.

Figure 13:
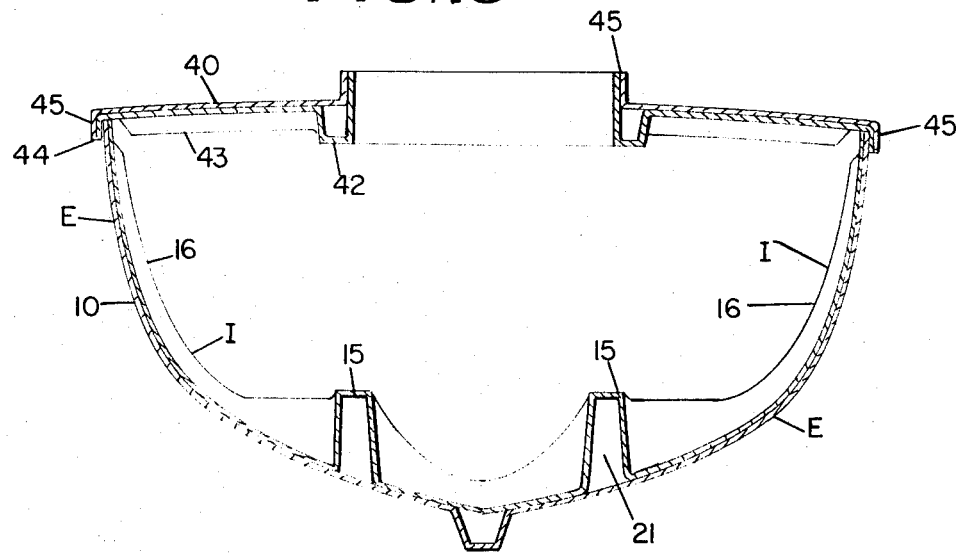

FIG. 13 is a cross sectional view of a completed boat.

Referring to the drawings wherein like numerals are used to designate similar parts throughout the several views, the numeral 10 refers to the hull of a boat constructed in accordance with my method of fabrication and consisting of an outer or exposed hull shell E and an inner hull shell I.

The outer and inner hull shells E and I are each fabricated simultaneously and separately in the conventional manner of "laying up" on an appropriate mold, the glass fibers and resins such as polyesters or epoxy and letting them set at least to a partial curing.

As shown by FIG. 3, the outer hull shell E is formed within a conventional one-piece female mold 11 which is supported by the support structure 12. The shape of the mold which is such as to produce the desired shaped boat hull is first polished with wax or a mold release liquid or parting agent such as polyvynil alcohol is then applied to the entire inside surface of the female mold 11. A gelcoat is then sprayed on the mold 11, the gelcoat consisting of a polyester resin with pigment and filler. Alternate layers of fiberglass mat and woven roving saturated with polyester resin are placed in the mold 11 conforming to and following the configuration of the mold 11 so that the outer hull shell E will have the same configurations as the mold 11. At room temperature, the resins will cure in about 6 hours, or if desired heat may be applied to cause the curing effect to take place in a lesser period.

Simultaneously with the laying up of the outer hull shell E, the inner shell I is laid up on a conventional male mold 13 supported on a support 14. The same proceedure given above in the laying up of the outer hull section 10 is followed in the formation and partial curing of the matching inner hull section I. However, the configuration of the mold 13 is such that the inner hull shell I will be formed with a plurality of longitudinal stiffeners 15 and a plurality of transverse stiffeners 16 extending along the full length of the hull I and interconnecting with the longitudinal stiffeners 15. A hole 17 is now bored in the inner shell I at the position of one of the longitudinal stiffeners 15 at the juncture of a transverse stiffener 16 into which opening 17 a pipe fitting 18 is mounted.

To the entire exposed surfaces of the inner and outer hull shells I and E while preferably lying in their respective molds 13 and 11, there is applied an adhesive of polyester or expoxy resin with glass fiber filler. While the outer shell E continues to remain on the mold 11, the inner shell I is removed from its mold 13 and superimposed on the outer shell E, as shown by FIG. 7. The edges 19 of both of the hulls are now trimmed and the juncture of both edges 19 sealed by a tape 20 to prevent any leakage of air therebetween. The longitudinal and transverse stiffeners 15 and 16 respectively which are now rigid, form communicating chambers or recesses 21 and 22 that extend to the edges 19 of the hulls I and E.

To the fitting 18, there is connected a vacuum creating apparatus V consisting of a pipe 25 on which a valve 26 is mounted, the pipe 25 extending to a tank 27. The tank 27 is connected by a pipe 28 that extends to the intake of a vacuum pump 29 whose outlet 30 is open to the atmosphere. While the adhesive of polyester or epoxy is still moist, the vacuum pump 29 is actuated to pump air out of the tank 27, discharging the air into the atmosphere and thereby creating a partial vacuum or pressure differential of from 2–3 psi in the tank 27 and the recesses or chambers 21 and 22. When the desired vacuum pressure has been attained in the tank 27, the valve 26 is opened to subject the shells I and E to the pressure differential. This differential pressure is insufficient to cause a collapsing of the hollow structures of the longitudinal and transverse stiffeners 15 and 16 but does cause a firm and even mating of the contacting surfaces of the hulls E and I. This curing period extends over a few hours, making it possible to fabricate a complete hull 10 within one day by molding the inner and outer hulls I and E simultaneously and permitting the adhesive cementing the hulls together to cure overnight. The next morning, the combined hull structure 10 is removed from the female mold 11 and is now ready to received a deck and other components such as engines, bulk-heading, interior panelling and the like.

It is to be noted that by this method, the exposed surfaces of the hull 10, namely the lower surface of the outer hull E and the upper surface of the inner hull I are a finished and smooth surface requiring no further finishing. Also, if additional reinforcements are required in a boat hull, they can readily be incorporated in the inner hull shell when being molded and become integrated into the hull structure when the inner and outer hull shells are cemented together by my vacuum method.

As shown by FIGS. 1–12 inclusive, the deck structure is fabricated by use of the same method described hereinabove. The outer deck shell 40 is fabricated on a female mold (not shown) in the conventional manner at the same time an inner matching deck shell 41 is fabricated on a male mold. The inner deck shell 41 is formed with hollow longitudinal and/or transverse stiffeners 42 and 43 that form communicating chambers when the outer deck shell 40 is superimposed on the female deck shell 41 as shown by FIG. 12. An adhesive is then applied to the surfaces that contact each other when the outer deck shell 40 is superimposed on the inner deck shell 41 and the inner and outer peripheral edges 44 and 45 of the shells 40 and 41 are trimmed. Then tape 46 is applied thereover. A hole 48 having previously been bored in the inner deck shell that communicates with the chambers formed by the hollow stringers 42 and 43 is provided with a vacuum fitting 49 to which the previously described vacuum creating apparatus V is connected. A vacuum pressure of 2–3 lbs. per square inch is maintained until the adhesive cementing the deck shells 40 and 41 together has become set. Then the combined deck shells 40, 41 are placed in position on the combined hull structure 10 and cemented along the edges 45 of the deck shells and the edges 19 of the combined hulls 10 in the conventional manner to complete fabrication of the boat.

What I claim as new and desired to secure by Letters Patent of the United States is:

1. The method of fabricating a hollow frame structure for boats and the like comprising the fabricating of an outer shell of fiberglass reinforced plastic on a first mold and the fabricating of an inner mating shell on a second mold, said second mold having a configuration forming hollow stiffeners on said inner mating shell, said integral hollow stiffeners extending along said inner shell and being cured sufficiently to be self supporting, applying an adhesive to at least a portion of the faying surfaces of said outer and inner shells, superimposing said inner shell on said outer shell, said stiffeners forming chambers, sealing the juncture of edge portions of said shells and applying a partial vacuum to said chambers whereby said faying surfaces are drawn toward each other until said adhesive becomes cured and the outer surfaces of the combined inner and outer shells become formed in a finished condition.

2. The method as recited by claim 1 wherein the edges of said outer and inner shells are trimmed and said inner shell is removed from said second mold prior to being superimposed on said outer shell and applying said adhesive only to that portion of each of said exposed surfaces that contact each other when said inner shell is superimposed on said outer shell.

3. The method as recited by claim 2 wherein said combined inner and outer shells form the hull of a boat.

4. The method as recited by claim 3 taken in combination with a second inner and outer shell fabricated and combined in substantially the same method as said first named inner and outer shells to form decking and adhesive means applied along edge portions of either of said hull of said boat or of said decking and positioning said decking on said hull to form a completed boat structure.

* * * * *